(12) United States Patent
Thompson et al.

(10) Patent No.: US 7,854,288 B2
(45) Date of Patent: Dec. 21, 2010

(54) AUTOMOTIVE FUEL STORAGE SYSTEM WITH IN-TANK FUEL BINDER SYSTEM

(75) Inventors: Robert Thompson, Redford, MI (US); Joseph Dierker, Jr., Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 905 days.

(21) Appl. No.: 11/621,583

(22) Filed: Jan. 10, 2007

(65) Prior Publication Data

US 2008/0163934 A1  Jul. 10, 2008

(51) Int. Cl.
*B60K 28/14* (2006.01)
*B60K 15/077* (2006.01)
*A62C 3/07* (2006.01)

(52) U.S. Cl. ............... 180/271; 180/282; 180/284; 220/4.14; 220/562; 169/62; 169/66; 169/68; 169/70; 137/351; 137/590; 701/45

(58) Field of Classification Search ........... 180/271, 180/282, 284; 220/4.14, 4.15, 562; 169/62, 169/66, 68, 70; 123/529; 137/351, 352, 137/590; 701/45
See application file for complete search history.

(56) References Cited

U.S. PATENT DOCUMENTS

| | | | | | |
|---|---|---|---|---|---|
| 1,347,057 | A | * | 7/1920 | Ross | 169/46 |
| 2,693,240 | A | * | 11/1954 | Gerald et al. | 169/45 |
| 2,718,330 | A | * | 9/1955 | Adamson | 220/88.3 |
| 3,084,292 | A | * | 4/1963 | Hunt | 329/367 |
| 3,174,550 | A | * | 3/1965 | Bugg | 169/44 |
| 3,237,894 | A | * | 3/1966 | Wight, Jr. | 244/129.2 |
| RE26,020 | E | * | 5/1966 | Powell | 169/66 |
| 3,583,593 | A | * | 6/1971 | Merritt | 220/560.02 |
| 3,876,011 | A | * | 4/1975 | Poitras | 169/57 |
| 3,924,773 | A | * | 12/1975 | Wilkinson | 220/88.3 |
| 4,088,193 | A | * | 5/1978 | Colgate | 169/45 |

(Continued)

FOREIGN PATENT DOCUMENTS

DE          20011086 U1 * 12/2000

(Continued)

OTHER PUBLICATIONS

L.D. Fedotov et al., System for reducing fire risk and pollution from aircraft making forced landing comprises on-board tanks of gelling agent to convert fuel into non-flammable state before impact, Sep. 10, 1997, Russian Patent Office, English Translation of Abstract.*

(Continued)

*Primary Examiner*—Paul N Dickson
*Assistant Examiner*—James English
(74) *Attorney, Agent, or Firm*—Jerome R. Orouillard; Frank A. MacKenzie

(57) ABSTRACT

An automotive fuel storage system includes a fuel storage tank and a binder fluid tank containing a supply of binder fluid. A mixer system connected with the binder fluid tank and the fluid storage tank mixes binder fluid throughout fuel contained within the storage tank, so as to increase the bulk viscosity of the fuel stored within the tank restricting the ability of the fuel to flow from the tank in the event of a collision of the vehicle.

11 Claims, 3 Drawing Sheets

U.S. PATENT DOCUMENTS

| | | | | |
|---|---|---|---|---|
| 4,177,863 | A | * | 12/1979 | Simon .......................... 169/62 |
| 4,286,070 | A | * | 8/1981 | DiGiulio et al. ............... 521/88 |
| 4,383,579 | A | * | 5/1983 | Monk .......................... 169/62 |
| 4,633,967 | A | * | 1/1987 | Kranz ........................ 180/274 |
| 4,702,322 | A | * | 10/1987 | Richardson ................. 169/28 |
| 5,531,290 | A | * | 7/1996 | Furuichi et al. ............. 180/271 |
| 6,223,526 | B1 | * | 5/2001 | Wissler et al. ................ 60/286 |
| 7,488,546 | B2 | * | 2/2009 | Kim et al. ...................... 429/8 |
| 2004/0046403 | A1 | * | 3/2004 | DePottey et al. ............ 293/118 |
| 2006/0253240 | A1 | * | 11/2006 | Rao et al. ..................... 701/48 |
| 2006/0273223 | A1 | * | 12/2006 | Haaland et al. .......... 244/129.2 |
| 2007/0045026 | A1 | * | 3/2007 | Theisen ...................... 180/274 |
| 2007/0108348 | A1 | * | 5/2007 | Peters .................... 244/135 R |
| 2007/0119605 | A1 | * | 5/2007 | Williams ..................... 169/68 |

FOREIGN PATENT DOCUMENTS

RU           2089465 C1 * 9/1997

OTHER PUBLICATIONS

Manuela Kopf, Apparatus for Preventing Fire Accidents in Fuel-operated Motor Vehicles of all Types by Means of Secondary Fuel Tank Safety Device, Dec. 21, 2000, German Patent Office, DE 200 11 086 U1, Hand Translation of Description.*

* cited by examiner

AUTOMOTIVE FUEL STORAGE SYSTEM WITH IN-TANK FUEL BINDER SYSTEM

BACKGROUND OF THE INVENTION

1. Field of the Invention

The present invention relates to an automotive fuel tank having a system for mixing a binder with the fuel during an emergency situation so as to restrict the ability of the fuel to flow from the fuel storage tank.

2. Disclosure Information

Police vehicles are subject to increased exposure to collisions, particularly high-speed rear-end collisions, arising from the need for police officers to stop on the shoulders, or even in the traffic lanes, of busy highways. Unfortunately, other motorists are known to collide with police vehicles employed in this manner. These accidents can compromise the fuel system on any vehicle and may cause fires. The present system is intended to suppress the spread of such a fire.

SUMMARY OF THE INVENTION

According to an aspect of the present invention, an automotive fuel storage system includes a fuel storage tank and a binder fluid tank containing a supply of binder fluid. Both tanks are installed in a vehicle. In the event of a collision having an intensity sufficient to substantially compromise the fuel tank's integrity, a mixer system connected with the binder fluid tank and with the fuel storage tank mixes the binder fluid throughout fuel contained within the storage tank, so as to increase the bulk viscosity of the fuel stored within the tank, thereby restricting the ability of the fuel to flow from the fuel storage tank. The binder fuel tank may be located either externally to the fuel storage tank or within the fuel storage tank itself.

According to another aspect of the present invention, binder fluid is provided as an injectable fluid preferably having a vapor pressure less than that of motor gasoline. The binder fluid may include a viscosity modifier such as an oil-soluble organic polymer. More specifically, the binder may include ethylene-propylene copolymers or styrene-diene copolymers, or generally, a liquid having a viscosity greater than the viscosity of liquid fuel and flammability less than the flammability of common liquid fuels such as gasoline.

According to another aspect of the present invention, a mixer system for distributing binder fluid throughout a fuel tank includes a number of mixing nozzles located so as to distribute the binder thoroughly throughout the fuel tank.

According to another aspect of the present invention, an automotive fuel storage system includes a controller having a pre-crash sensing system which may include, for example, a radar detector, an ultrasonic detector, or other types of pre-crash sensing devices known to those skilled in the art and suggested by this disclosure.

It is an advantage of an automotive fuel storage system according to the present invention that the flow of the fuel from a tank having a collision related loss of integrity will be lessened, so as to concomitantly lessen a fire risk.

Other advantages, as well as features of the present invention will become apparent to the reader of this specification.

DETAILED DESCRIPTION OF THE PREFERRED EMBODIMENT

Figure 1:
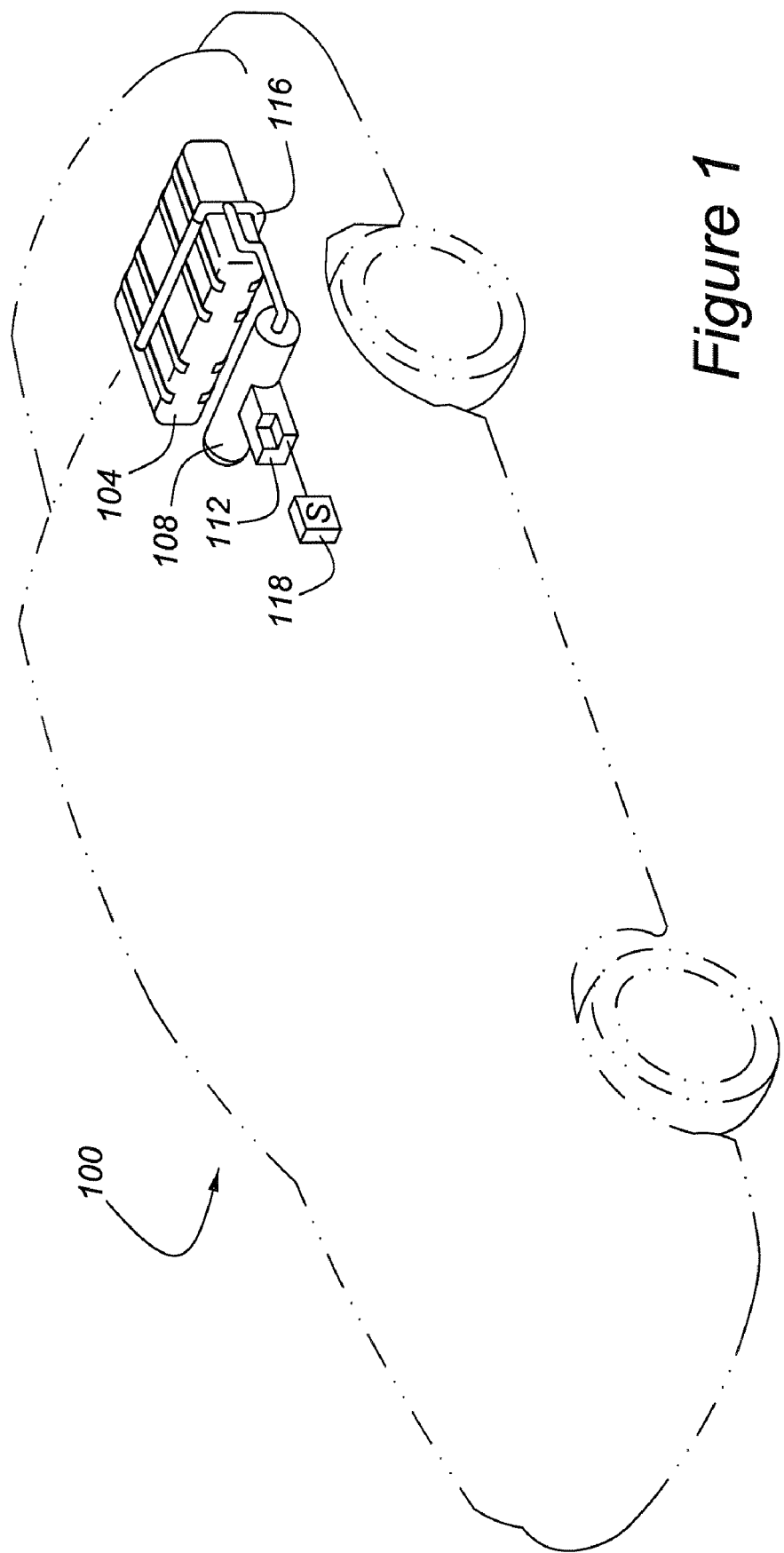
FIG. 1 is a perspective view of an automotive vehicle having a fuel storage system according to the present invention.

As shown in FIG. 1, vehicle 100 has a fuel storage tank 104. FIG. 1 also shows a binder fluid tank 108 and a manifold 116 extending between binder fluid tank 108 and fuel storage tank 104. Controller 112 is provided for the purpose of initiating flow of binder fluid from tank 108 into fuel storage tank 104. A manual switch, 118, is also provided for initiating the transfer of the binder fluid into the fuel storage tank. Controller 112 includes the capability of pre-crash sensing, as provided by radar or ultrasonic detection or other types of pre-crash sensing known to those skilled in the art and suggested by this disclosure. The use of pre-crash sensing will allow binder fluid to be placed within fuel tank 104 in sufficient time to increase the bulk viscosity of the fuel. By binding or coagulating the fuel in tank 104, the ability of the fuel to flow from fuel storage tank 104 in the event of a collision will be substantially curtailed.

Figure 2:
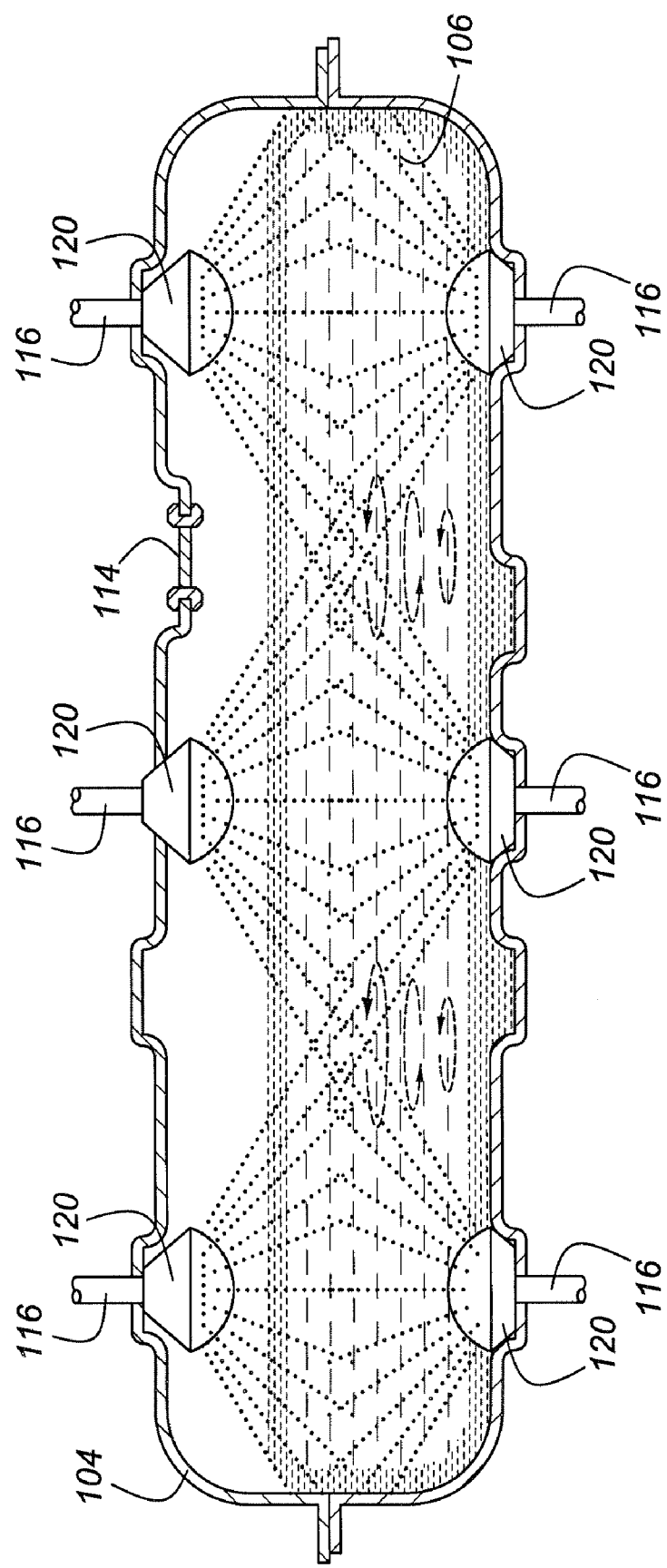
FIG. 2 shows an interior portion of a fuel storage tank according to the present invention.

FIG. 2 shows details of fuel tank 104. Specifically, fuel 106 normally occupies some or all of the volume within tank 104. However, in the event that controller 112 initiates transfer of binder fluid 110 into fuel tank 104, binder fluid 110 will be forcibly ejected into tank 104 by means of mixing nozzles 120 such that all of the fuel within fuel tank 104 will be treated with binder fluid simultaneously. Mixing nozzles 120 are configured so that binder fluid 110 bores into, and thoroughly mixes with, fuel 106. Accordingly, the bulk viscosity of fuel 106 is changed very rapidly.

Figure 3:
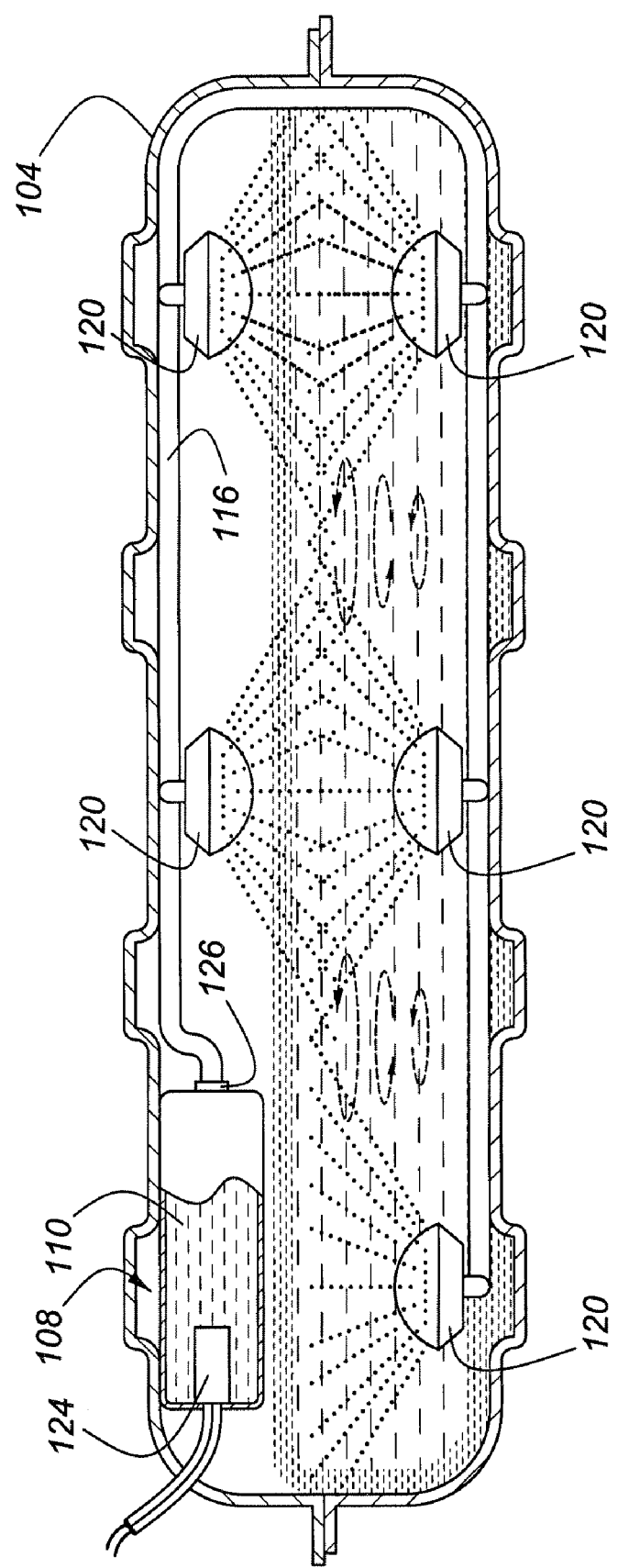
FIG. 3 shows a second embodiment of a fuel storage tank according to the present invention.

As shown in FIG. 3, binder fluid tank 108 may alternatively be located within fuel tank 104. FIG. 3 also shows binder fluid tank 108 as including fluid 110 and propellant 124. Propellant 124 may be either a cold gas inflator or a pyrotechnic device. Some of these devices are known to those skilled in the art of fire suppression systems. Burst disk 126 prevents binder fluid 110 from leaving binder fluid tank 108 until initiated by propellant 124. Blow-out valve 114 is provided on the top of fuel tank 104 to relieve pressure created when binder fluid 110 flows into tank 104.

Those skilled in the art will recognize that a variety of binder fluids could be used with the present invention, including not only oil-soluble organic polymers such as ethylene-propylene copolymers or styrene-diene copolymers, but also other types of organic or inorganic chemicals known to promote increases in the viscosity of hydrocarbon liquids.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. An automotive fuel storage system, comprising:
 a fuel storage tank installed in a vehicle;
 a binder fluid tank comprising a reservoir located within said fuel storage tank and containing a supply of binder fluid;
 a propellant for expelling the binder fluid from said reservoir and into a mixer system connected with said binder fluid tank and with said fuel storage tank, for mixing the binder fluid throughout fuel contained within said storage tank, so as to increase the bulk viscosity of said fuel stored within the storage tank, thereby restricting the ability of the fuel to flow from the fuel storage tank and a controller having a pre-crash sensing system for triggering the discharge of said propellant.

2. An automotive fuel storage system according to claim 1, wherein said binder fluid comprises an injectable fluid having a vapor pressure less than that of motor gasoline.

3. An automotive fuel storage system according to claim 2, wherein said binder fluid comprises a viscosity modifier.

4. An automotive fuel storage system according to claim 1, wherein said mixer system comprises a plurality of mixing nozzles located so as to distribute said binder fluid throughout fuel contained within said fuel storage tank.

5. An automotive fuel storage system according to claim 1, wherein said binder fluid comprises a liquid having a viscosity greater than the viscosity of gasoline, and a flammability less than the flammability of gasoline.

6. An automotive fuel storage system according to claim 5, wherein said binder fluid comprises a hydrocarbon.

7. An automotive fuel storage system according to claim 1, wherein said binder fluid comprises ethylene-propylene copolymers.

8. An automotive fuel storage system according to claim 1, wherein said binder fluid comprises styrene-diene copolymers.

9. An automotive fuel storage system according to claim 1, wherein said pre-crash sensing system comprises a radar detector.

10. An automotive fuel storage system according to claim 1, wherein said pre-crash sensing system comprises an ultrasonic detector.

11. An automotive fuel storage system according to claim 1, further comprising a manual control for initiating the discharge of binder fluid into said fuel storage tank.

* * * * *